(12) United States Patent
Takahashi

(10) Patent No.: US 6,884,281 B2
(45) Date of Patent: Apr. 26, 2005

(54) METHOD AND APPARATUS FOR PREPARATION AND DEAERATION OF COATING LIQUID

(75) Inventor: Yasuo Takahashi, Fujinomiya (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 134 days.

(21) Appl. No.: 10/378,898

(22) Filed: Mar. 5, 2003

(65) Prior Publication Data

US 2004/0173093 A1 Sep. 9, 2004

(51) Int. Cl.[7] ............................................. B01D 19/00
(52) U.S. Cl. ........................ 95/30; 96/175; 96/196; 95/260; 95/266; 427/565; 118/610
(58) Field of Search ........................... 95/30, 260, 266; 96/175, 196, 217; 427/565; 118/610, 612, 600

(56) References Cited

U.S. PATENT DOCUMENTS

| 3,853,500 | A | * | 12/1974 | Gassmann et al. | ............... 95/30 |
| 4,205,966 | A | * | 6/1980 | Horikawa | ..................... 95/30 |
| 6,648,943 | B1 | * | 11/2003 | Possanza et al. | ............... 95/30 |

FOREIGN PATENT DOCUMENTS

| JP | 06130547 A | * | 5/1994 | ............ G03C/1/74 |
| JP | 11-262601 | | 9/1999 | |
| JP | 411314012 A | * | 11/1999 | ............ B01D/19/00 |
| JP | 2001219004 A | * | 8/2001 | ............ B01D/19/00 |

* cited by examiner

*Primary Examiner*—Duane Smith
*Assistant Examiner*—Douglas J. Theisen
(74) *Attorney, Agent, or Firm*—Young & Thompson

(57) ABSTRACT

First, the overall quantity of bubbles in a coating liquid is reduced in advance by vacuum deaeration performed in conjunction with preparation of the coating liquid in a stirring tank in a first step, then bubbles of relatively large sizes, of bubbles that have not been removed in the first step are removed by a tank type deaeration device with ultrasonic waves in a floatation tank in a second step, and finally bubbles of very small to small sizes that are difficult to remove in the first and second steps are dissolved in the liquid under pressure with ultrasonic waves and thereby removed in a pipeline in a third step. According to this, bubbles in the coating liquid can reliably be removed irrespective of the nature of the coating liquid, a large amount of coating liquid can be treated, and the possibility that the quality of the deaerated coating liquid is adversely affected is eliminated.

8 Claims, 2 Drawing Sheets

METHOD AND APPARATUS FOR PREPARATION AND DEAERATION OF COATING LIQUID

BACKGROUND OF THE INVENTION

1. Field of the Invention

The present invention relates to a method and an apparatus for preparation and deaeration of a coating liquid, and particularly relates to a method and an apparatus for removing bubbles in a coating liquid of photothermographic material having a thixotropic nature and having a nature in which components of the coating liquid coagulate when a high level of shear force is applied.

2. Description of the Related Art

When a coating liquid of photographic sensitive material or the like is applied to a base, bubble troubles such as bubble lines and pinholes occur in a coating film on the base if bubbles remain in the coating liquid. Therefore, all bubbles including very small to large bubbles remaining in the coating liquid should be completely removed before the coating liquid is applied to the base.

Conventional deaeration methods for removing bubbles from the coating liquid are as follows.

For one deaeration method, an ultrasonic wave is applied to the coating liquid under pressure. In this deaeration method, principally, bubbles of very small to small sizes in the coating liquid are dissolved in the coating liquid to perform deaeration. This deaeration method has been widely used for deaeration of coating liquids for information recording materials such as photographic sensitive materials and the like of which the performance is influenced by very small bubbles because even very small bubbles existing in the coating liquid can be removed effectively. However, this deaeration method has disadvantages that there may be cases where deaeration is not performed effectively when a large quantity of bubbles exist in the coating liquid and that much time is required for carrying out deaeration, although bubbles of very small to small sizes can effectively be removed.

Other deaeration methods include a centrifugal separation type deaeration method in which the coating liquid is subjected to a centrifugal force to expel bubbles, and a thin film type deaeration method in which the coating liquid is spread into a thin film to expel bubbles. However, this deaeration method is effective for removal of large size bubbles in the coating liquid, but has a disadvantage that it is almost impossible to remove bubbles of very small to small sizes, particularly bubbles of very small sizes.

In addition, as another deaeration method, there is a vacuum deaeration method for removing bubbles and dissolved air in the coating liquid, in which the coating liquid is put in a tank and the pressure in the tank is reduced using a suction pump or the like to perform deaeration.

Conventionally, for reliably removing bubbles of very small to large sizes in the coating liquid, the above described deaeration methods are combined to perform deaeration as disclosed in Japanese Patent Application Publication No. 11-262601.

However, some types of coating liquids have a very strong thixotropic nature (in which a high degree of viscosity is retained under low levels of shearing, and the degree of viscosity gradually decreases as the level of shearing is increased) compared with the photographic sensitive material described above, and have a difficult nature in which components of the coating liquid coagulate when a high level of shear force is applied to the coating liquid, like the coating liquid of photothermographic material for example.

Therefore, in the case of the coating liquid of photothermographic material, the viscosity under low levels of shearing is so high that the speed at which bubbles move in the coating liquid is very low and thus a considerable amount of time is required for performing deaeration in ordinary vacuum deaeration. Nevertheless, if a high level of shear force is applied to the coating liquid to reduce the viscosity before performing deaeration, components of the coating liquid coagulate as described above, and consequently the quality of the coating liquid is adversely affected.

Also, the deaeration method using a centrifugal force cannot be applied to the photothermographic material because eventually, a high level of shearing force is applied to the coating liquid, and therefore components of the coating liquid coagulate. On the other hand, the deaeration method in which the coating liquid is spread into a thin film to expel bubbles has a disadvantage that the treatment efficiency is so low that a large amount of coating liquid cannot be treated although a high level of shear force is not applied to the coating liquid.

From the background described above, in the case where the centrifugal separation type deaeration step is included in the technique disclosed in Japanese Patent Application Publication No. 11-262601, the method cannot be applied to the coating liquid of photothermographic material although it can be applied to the coating liquid of photographic sensitive material. Also, in the case where the thin film type deaeration step is included in the technique disclosed in Japanese Patent Application Publication No. 11-262601, a large amount of coating liquid cannot be treated because deaeration performance is inevitably reduced in the thin film type deaeration step. Accordingly, a method and an apparatus capable of reliably removing bubbles of very small to large sizes irrespective of the nature of the coating liquid, and treating a large amount of coating liquid, and eliminating the possibility that the quality of the deaerated coating liquid is adversely affected have been required.

SUMMARY OF THE INVENTION

The present invention has been devised in view of these situations, and provides a method and an apparatus for preparation and deaeration of a coating liquid, capable of reliably removing bubbles in the coating liquid irrespective of the nature of the coating liquid, and treating a large amount of coating liquid, and eliminating the possibility that the quality of the deaerated coating liquid is adversely affected, and is particularly intended for providing a method and an apparatus that can also be applied to a coating liquid of photothermographic material having a thixotropic nature and having a nature in which components of the coating liquid coagulate when a high level of shear force is applied.

In order to attain the above object, the present invention is directed to a method for preparation and deaeration of a coating liquid, the method comprising: a first step of stirring and mixing a plurality of coating liquid constituent liquids fed into a stirring tank at such a low speed that bubbles are not formed to prepare a coating liquid, and removing bubbles in the liquid under reduced pressure; a second step of applying an ultrasonic wave to the coating liquid after the first step under one of atmospheric pressure and reduced pressure in a floatation tank to cause bubbles in the coating liquid to grow and gather and float to a surface of the liquid, thereby removing the bubbles in the liquid; and a third step of continuously feeding the coating liquid after the second step through a pipeline in such a manner that no liquid surface is created, and applying an ultrasonic wave to the coating liquid flowing through the pipeline under pressure to dissolve bubbles in the coating liquid, thereby removing the bubbles in the coating liquid.

In order to attain the above object, the present invention is also directed to an apparatus for preparation and deaeration of a coating liquid, the apparatus comprising: constituent liquid tanks which hold a plurality of coating liquid constituent liquids for preparation of a coating liquid; a preparation and deaeration device which stirs and mixes the coating liquid constituent liquids fed into a stirring tank from the constituent liquid tanks at such a low speed that bubbles are not formed to prepare the coating liquid, and removes bubbles in the liquid under reduced pressure; an ultrasonic floatation type deaeration devices which applies an ultrasonic wave to the coating liquid prepared and deaerated in the preparation and deaeration device in a floatation tank under one of atmospheric pressure and reduced pressure so as to remove bubbles in the coating liquid; and a pipeline type continuous deaeration device which continuously feeds the coating liquid deaerated in the ultrasonic floatation type deaeration device through a pipeline in such a manner that no liquid surface is created, and simultaneously applies an ultrasonic wave to the coating liquid under pressure to dissolve bubbles in the coating liquid so as to remove the bubbles in the coating liquid.

According to the present invention, the overall amount of coating liquid is first reduced by vacuum deaeration carried out in conjunction with preparation of the coating liquid in the stirring tank in the first step, bubbles of relatively large sizes, of bubbles that have not been removed in the first step, are then removed by a tank type deaeration apparatus in the floatation tank in the second step, and bubbles of very small to small sizes that are difficult to remove in the first and second steps are dissolved in the liquid under pressure to perform deaeration in the pipeline in the third step. In this way, bubbles of very small to large sizes in the coating liquid can reliably be removed, and the first to third steps are a combination of vacuum deaeration type deaeration and ultrasonic wave type deaeration, and therefore eliminate the possibility that a high level of shear force is exerted. Therefore, deaeration method can be used for a coating liquid of photothermographic material having a thixotropic nature and having a nature in which components coagulate when a high level of shear force is applied, and is thus capable of being applied irrespective of the nature of the coating liquid.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

A method and an apparatus for preparation and deaeration of a coating liquid according to the present invention will be described in detail below in accordance with the accompanying drawings.

Figure 1:
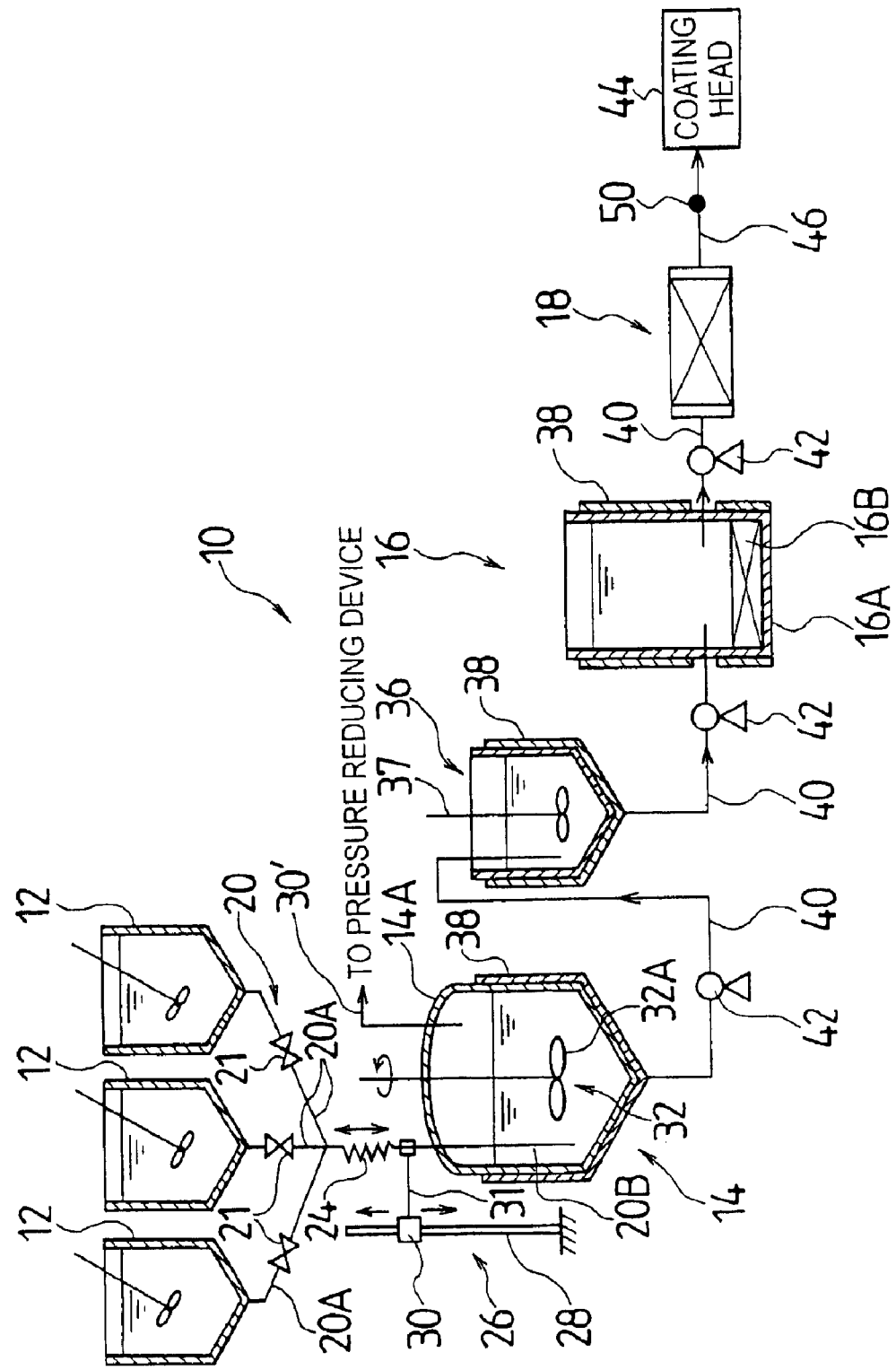
FIG. 1 is a general block diagram of an apparatus for preparation and deaeration of a coating liquid of the present invention.

FIG. 1 is a general block diagram of an apparatus 10 for preparation and deaeration of coating liquid of the present invention, which is comprised of three steps: a first step constituted by a plurality of constituent liquid tanks 12, 12 . . . and a preparation and deaeration device 14, a second step constituted by an ultrasonic floatation type deaeration device 16, and a third step constituted by a pipeline type continuous deaeration device 18.

The constituent liquid tanks 12 are placed above the preparation and deaeration device 14, and coating liquid constituent liquids held in the constituent liquid tanks 12 are fed to the preparation and deaeration device 14 via a liquid feeding pipe 20. The liquid feeding pipe 20 is constituted by branch pipes 20A with valves 21, which extend downward from the bottoms of the constituent liquid tanks 12, and a merge pipe 20B into which the branch pipes 20A are merged, and the outlet of the liquid feeding pipe 20 is located in a stirring tank 14A of the preparation and deaeration device 14. Consequently, the coating liquid constituent liquids uniformly mixed in the constituent liquid tanks 12 are fed to the stirring tank 14A by gravity by opening the valves 21 of the branch pipes 20A. The outlet of the liquid feeding pipe 20 is located as close to the bottom of the stirring tank 14A as possible when a first coating liquid constituent liquid is fed, and it is located below the liquid surface of the previously fed coating liquid constituent liquid when a second coating liquid constituent liquid is fed. Consequently, bubbles are not formed on the liquid surface when the liquid is fed, thus making it possible to reduce the possibility that bubbles are entrained in the liquid. For the specific location of the outlet of the liquid feeding pipe 20, it is located below the liquid surface from a viewpoint of prevention of entrainment of bubbles, and is preferably 3 cm or more, further preferably 10 cm or more below the liquid surface. The location of the outlet of the liquid feeding pipe 20 can be fixed at a location as close to the bottom of the stirring tank 14A as possible, but from a viewpoint of feeding efficiency, it is preferable that the location of the outlet of the liquid feeding pipe 20 can be changed depending on the height of the liquid surface in the stirring tank 14A. That is, as the coating liquid constituent liquids are fed, the height of the liquid surface in the stirring tank 14A increases to exert a high level of pressure on the outlet of the liquid feeding pipe 20, and therefore the feeding speed drops. Since this is not limited to the feeding of liquid using gravity, and even when the liquid is fed using a pump (not shown), the load on the pump is increased as the height of the liquid surface in the stirring tank 14A increases, and it is preferable that the location in height of the outlet of the liquid feeding pipe 20 can be shifted depending on the height of the liquid surface.

Means for shifting the location of the outlet of the liquid feeding pipe 20 may be such that an flexible pipe 24 that can be expanded and contracted is provided in midstream of the liquid feeding pipe 20, and the height of the outlet of the liquid feeding pipe 20 is adjusted in such a manner that the flexible pipe 24 is expanded and contracted by an expanding-contracting device 26, for example. The expanding-contracting device 26 is not specifically limited, but for example, a horizontal arm 31 is provided in a self-powered slide body 30 engaged with a column 28 to slide in the vertical direction, and the liquid feeding pipe 20 is held at the end of this horizontal arm 31. Consequently, the height of the outlet of the liquid feeding pipe 20 can be slide-shifted depending on the height of the liquid surface in the stirring tank 14A.

Furthermore, the liquid feeding pipe 20 is so constituted that the branch pipes 20A are merged into the merge pipe 20B in FIG. 1, but the constituent liquid tanks 12 may be connected to the stirring tank 14A by separate liquid feeding pipes 20, and the flexible pipe 24 and the expanding-contracting device 26 may be provided in each of the liquid feeding pipes 20.

The preparation and deaeration device 14 has the stirring tank 14A of closed tank type, a vacuum pipe 30' extending from a head space in the upper part of the stirring tank 14A is connected to a pressure reducing device. In the stirring tank 14A, the coating liquid constituent liquids are mixed under reduced pressure. For the mixing method, a well known method may be used, but the liquids should be stirred at such a low speed that bubbles are not formed by the stirring. FIG. 1 shows a stirring device 32 using a stirring blade 32A, and a turbine blade or the like may be used as the stirring blade 32A. For the stirring blade 32A, one with the diameter of about 10 cm to 200 cm may be used, and a single-stage or multistage type, or a biaxial type may be used as appropriate, depending on the volume, the diameter, the height and the like of the stirring tank 14A. For the speed of stirring, the circumference speed is preferably in the range of from 1 to 10 in/second, particularly preferably from 1 to 5 m/second when the stirring blade 32A is used. The reason for this is that if the circumference speed is less than 1 /second, the liquid flow in the stirring tank 14A is not sufficient, and thus the liquid is more likely unevenly mixed. On the other hand, if the circumference speed exceeds 10 m/second, a high level of shear force is exerted on the coating liquid, and components of the coating liquid may coagulate in the case of coating liquid of photothermographic material or the like. Also, the circumference speed of the stirring blade 32A may be changed between the stirring for preparation and the stirring for deaeration of the coating liquid as long as the circumference speed is in the range of from 1 to 10 m/second described above.

Also, the level of reduced pressure in the stirring tank 14A is preferably greater than 5 kPa and lower than 60 kPa as absolute pressure. The reason for this is that there is little effect of deaeration if the level of reduced pressure in the stirring tank 14A is 60 kPa or greater, and not only the pressure-resistance structure becomes extensive but also the effect of deaeration is not significant, causing problems such as a drop in liquid temperature if the level of reduced pressure in the stirring tank 14A is 5 kPa or lower.

In this way, by vacuum deaeration performed in conjunction with preparation of the coating liquid in the stirring tank 14A, bubbles that are more easily removed, of bubbles in the coating liquid, can be removed to reduce the overall quantity of bubbles in advance. In this case, the vacuum condition may be created at the time when the mixing of coating liquid constituent liquids is started, or the vacuum condition may be created to perform deaeration at the time when the mixing is almost completed. The amount of time required for preparation and deaeration by vacuum deaeration of the coating liquid is usually about 10 minutes to 5 hours.

Also, a jacket 38 is provided on the periphery of the stirring tank 14A, or a hot water pipe or the like is placed in the stirring tank 14A so that the liquid in the stirring tank 14A can be kept at a temperature of no less than 20° C. and no more than 50° C. The coating liquid prepared and deaerated in the preparation and deaeration device 14 is fed through a pipe 40 to a stock tank 36 by a non-pulsation pump 42, and is held in the stock tank 36 on a temporary basis. Then, the coating liquid is fed from the stock tank 36 through the pipe 40 to the ultrasonic floatation type deaeration device 16 by the non-pulsation pump 42 capable of changing the amount of fed liquid. By providing the stock tank 36, the line after the ultrasonic floatation type deaeration device 16 can be operated continuously even if the preparation and deaeration of the coating liquid in the stirring tank 14 is carried out in batch. Thus, there is an advantage that the line of the preparation and deaeration apparatus is configured as a semi-continuous type apparatus, but the configuration in which the stock tank 36 is not provided is acceptable. In the case where the stock tank 36 is provided, it is preferable that the jacket 38 is provided on the periphery of the stock tank 36 as well, or a hot water pipe or the like is placed in the stock tank 36 so that the liquid in the stock tank 36 can be kept at a temperature of no less than 20° C. and no more than 50° C. Also, it is preferable that a stirrer 37 is provided to stir the liquid at a low speed. For example, if the stirring blade 32A is used in place of the stirring tank 14A, the circumference speed is preferably in the range of from 1 to 10 m/second, particularly preferably from 1 to 5 m/second.

The ultrasonic wave type floatation type deaeration device 16 is a tank type deaeration device with an ultrasonic wave generator 16B placed in the bottom of a floatation tank 16A, wherein an ultrasonic wave is applied to cause bubbles in the coating liquid to grow and gather and be floated to the liquid surface, thereby performing deaeration. In this case, the frequency of the ultrasonic wave generator 16B is preferably in the range of from 25 to 40 kHz. In this case, the frequency of the ultrasonic wave generator 16B can be continuously modulated to a predetermined bandwidth within 25 to 40 kHz around an oscillation frequency determined as a reference. For the pressure in the floatation tank 16A, deaeration may be carried out under atmospheric pressure, but it is preferable that deaeration is carried out under reduced pressure because bubbles can quickly be floated to the liquid surface by creating a vacuum condition. In this ultrasonic floatation type deaeration device 16, bubbles of relatively large sizes are removed, and the deaeration time is set preferably to 1 to 60 minutes.

Also, the jacket 38 is provided on the periphery of the floatation tank 16A, or a hot water pipe or the like is placed in the floatation tank 16A so that the liquid in the floatation tank 16A can be kept at a temperature of no less than 20° C. and no more than 50° C. The coating liquid deaerated in the ultrasonic floatation type deaeration device 16 is fed through the pipe 40 to the pipeline type continuous deaeration device 18 by the non-pulsation pump 42.

Figure 2:
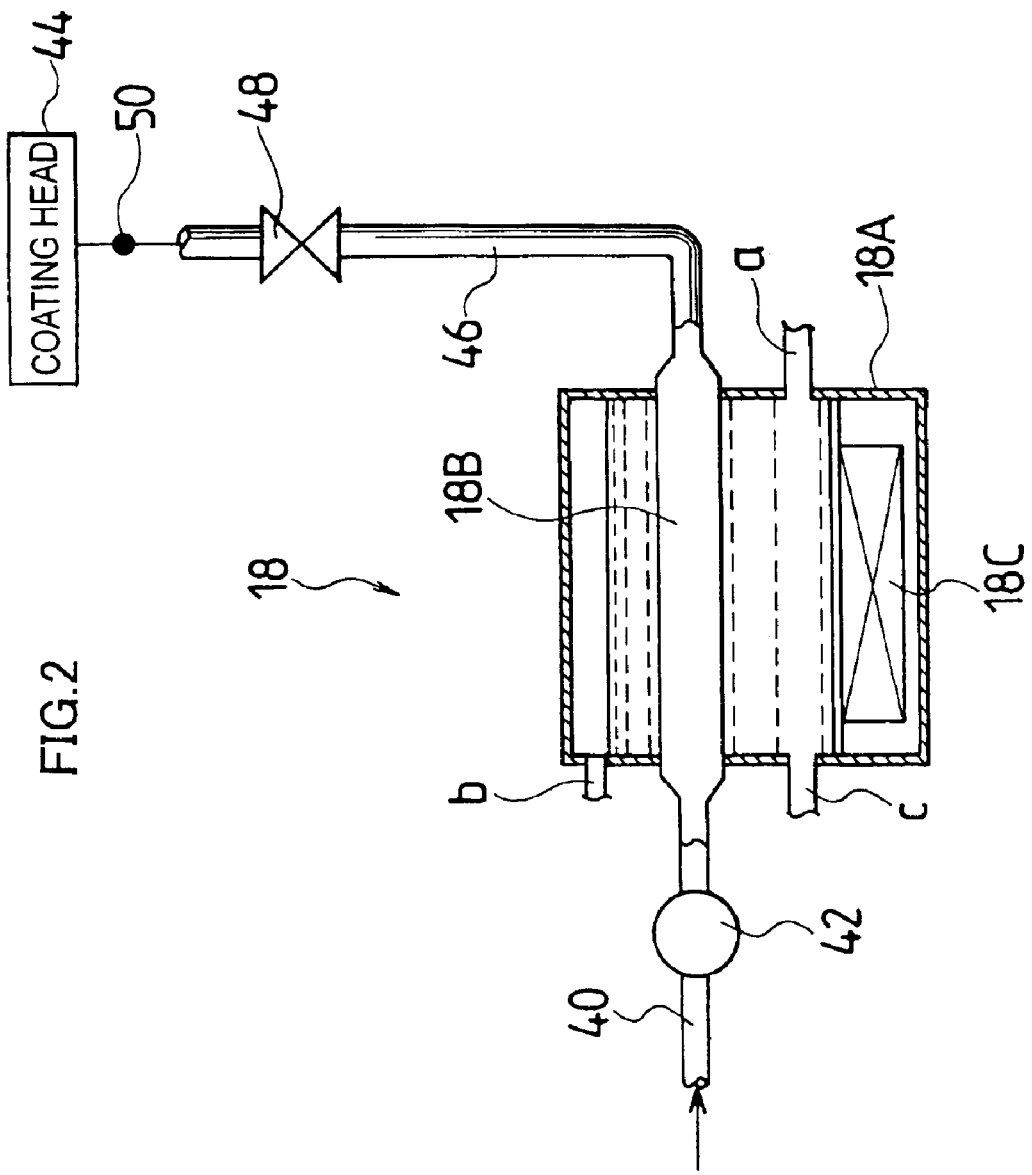
FIG. 2 is an explanatory view of a pipeline type deaeration device.

The pipeline type continuous deaeration device 18 may be the device described in Japanese Patent Application Publication No. 53-139274, and is constituted mainly by a pipeline 18B horizontally placed in an ultrasonic liquid tank 18A and an ultrasonic vibrator 18C provided in the bottom of the ultrasonic liquid tank 18A for its structure as shown in FIG. 2. The pipeline 18B has a circular pipe of a thin wall with a smooth inner face, the inlet is connected to the pipe 40 from the ultrasonic floatation type deaeration device 16, and the outlet is connected to a supply pipe 46 to a coating head 44. Hot water as an ultrasonic wave propagating liquid is continuously supplied into the ultrasonic liquid tank 18A through a water inlet a on the side face in the lower part of the tank to fill the tank, and is then discharged through an outlet b on the side face in the upper part of the tank. Consequently, the ultrasonic wave emitted from the ultrasonic vibrator 18C is propagated through the pipeline 18B by the ultrasonic wave propagating liquid, and is applied to the coating liquid flowing through the pipeline 18B. Also, the liquid in the pipeline 18B is kept at a temperature of no less than 20° C. and no more than 50° C. by this ultrasonic wave propagating liquid. The frequency applied to the coating liquid flowing through the pipeline 18B is preferably in the range of from 25 to 40 kHz. Furthermore, reference character c in FIG. 2 denotes an exhaust port for discharging the ultrasonic wave propagating liquid from the ultrasonic liquid tank 18A.

Also, the supply pipe 46 is provided with a valve 48, and the coating liquid flowing through the pipeline 18B is kept under a predetermined level of pressure by the above described pressure type non-pulsation pump 42 and the valve 48. The level of pressure is preferably in the range of from 130 to 400 kPa, further preferably from 160 to 250 kPa as absolute pressure.

A bubble detector 50 is placed between the valve 48 of the supply pipe 46 and the coating head 44 for ensuring the supply of the coating liquid to the coating head 44. For the bubble detector 50, for example, the bubble detector described in Japanese Patent Application Publication No. 3-157103 may be used. According to this bubble detector 50, the ultrasonic wave is applied to the coating liquid flowing through a conduit pipe, a resulting change in acoustic impedance in the acoustic field is converted into an electric impedance of an ultrasonic oscillator, and this change is outputted from the bubble detector as an electric signal to detect the number of bubbles in the coating liquid.

The preparation and deaeration method of the present invention using the preparation and deaeration apparatus 10 configured as described above will now be described.

First, in a first step, the location of the outlet of the liquid feeding pipe 20 for feeding coating liquid constituent liquids from the constituent liquid tanks 12 to the stirring tank 14A is located near the bottom of the stirring tank 14A, and the first coating liquid constituent liquid is fed from the constituent liquid tank 12. When the second and subsequent coating liquid constituent liquids are fed, the location of the outlet of the liquid feeding pipe 20 is shifted upward depending on the height of the liquid surface in the stirring tank 14A by the expanding-contracting device 26. In this case, the location of the outlet of the liquid feeding pipe 20 is located 3 cm or more below the liquid surface so that bubbles are not formed during the feeding of liquid. Then, in the stirring tank 14A, coating liquid constituent liquids are stirred and mixed under reduced pressure greater than 5 kPa and lower than 60 kPa as absolute pressure and at a low speed of 1 to 10 m/second as the circumference speed of the stirring blade 32A to carry out preparation and deaeration. In this way, the coating liquid is prepared, and also easily removable bubbles in the coating liquid are removed to reduce the overall quantity of bubbles in advance. In this case, the stirring and mixing may be started when the feeding of the second coating liquid constituent liquid is started, or the stirring and mixing may be started after all coating liquid constituent liquids are fed.

Then, in a second step, an ultrasonic wave of a frequency in the range of from 25 to 40 kHz can be applied to the coating liquid under atmospheric pressure or reduced pressure to cause bubbles in the coating liquid to grow and gather and be floated to the liquid surface to perform deaeration in the floatation tank 16A. In this way, bubbles of relatively large sizes, of bubbles that have not been removed in the first step, are removed. For removal of bubbles of relatively large sizes, the method of removing bubbles by a centrifugal force such as centrifugal separation has so far been used, but this method involves a high level of shear force inserted on the coating liquid, and therefore cannot be used for coating liquids having a nature in which components of the coating liquid coagulate when a high level of shear force is applied, like coating liquids for photothermographic materials. In this respect, by using a tank type deaeration device using ultrasonic vibrations like the ultrasonic floatation type deaeration device 16, the possibility that a high level of shear force is exerted on the coating liquid is eliminated, and therefore components of the coating liquid do not coagulate even when the device is used for the photothermographic material. Thus, deaeration can be performed satisfactorily without adversely affecting the quality of the deaerated coating liquid.

Finally, in a third step, the coating liquid is continuously fed so that no liquid surface is created in the pipeline 18B, and an ultrasonic wave having a frequency in the range of from 25 to 40 kHz is applied to the coating liquid flowing through the pipeline 18B under pressure of 130 to 400 kPa as absolute pressure. In this way, bubbles of very small to small sizes that are difficult to remove in the first and second steps can be dissolved in the coating liquid to perform deaeration. In this case, the third step is also a deaeration method using ultrasonic vibrations, and therefore eliminates the possibility that a high level of shear force is exerted on the coating liquid.

Also, in the first to third steps described above, it is preferable that control is performed so that the temperature of the coating liquid gradually decreases as the coating liquid is fed from the stirring tank 14A to the coating head 44. Specifically, the difference between the temperature of the coating liquid in the stirring tank 14A and the gradually decreasing temperature of the coating liquid supplied to the coating head 44 is preferably 1 to 20° C., further preferably 2 to 10° C. In this case, it is still further preferable that means capable of controlling the temperature of the coating liquid is provided to perform temperature control also for the pipe 40 linking together the stirring tank 14A, the stock tank 36, the floatation tank 16A and the pipeline 18B, and the supply pipe 46 linking together the pipeline 18B and the coating head 44. The means for controlling the temperature for the pipe 40 and the supply pipe 46 can be achieved by winding a jacket around the pipe 40 and the supply pipe 46, or modifying the pipe 40 and the supply pipe 46 into duplex structures and making a temperature-controlled medium flow through the outer pipe.

According to the present invention, a method and an apparatus for preparation and deaeration of a coating liquid capable of reliably removing bubbles in the coating liquid irrespective of the nature of the coating liquid, and treating a large amount of coating liquid, and eliminating the possibility that the quality of the deaerated coating liquid is adversely affected by combining the first step of performing preparation and vacuum deaeration of the coating liquid, the second step of performing tank-type deaeration using an ultrasonic wave, and the third step of performing pressure deaeration using an ultrasonic wave in the pipeline 18B can be provided. In particular, the method and the apparatus can be applied to a coating liquid of photothermographic material having a thixotropic nature and having a nature in which components of the coating liquid coagulate when a high level of shear force is applied.

Particularly, in the preparation and deaeration apparatus of the present invention, the ultrasonic floatation type deaeration device 16 as a tank type deaeration device is employed for removal of bubbles of large sizes in the coating liquid, whereby a high level of shear force is not exerted on the coating liquid, and a large amount of coating liquid can be treated. In this case, easily removable bubbles in the liquid are removed to reduce the overall quantity of bubbles in advance in the first step, and then the coating liquid is treated in the ultrasonic floatation type deaeration device 16 in the second step, thus making it possible to further improve the deaeration effect in the floatation tank 16A compared to the case where the coating liquid is treated by the ultrasonic floatation type deaeration device 16 from the beginning.

Also, the third step of performing pressure deaeration is provided after the first step by vacuum deaeration and the second step that is a tank type deaeration method using an ultrasonic wave, thereby making it possible to sufficiently enhance deaeration performance even in pressure deaeration in which deaeration performance is easily deteriorated if there exist a large quantity of bubbles in the coating liquid.

In addition, deaeration of the first to third steps is a combination of deaeration of the vacuum deaeration type and ultrasonic type deaeration, thus eliminating the possibility that a high level of shear force is exerted on the coating liquid. Therefore, it can be used for the coating liquid of photothermographic material having a thixotropic nature and having a nature in which components of the coating liquid coagulate when a high level of shear force is applied, and is thus capable of being applied irrespective of the nature of the coating liquid.

Then, preferred aspects of photothermographic materials when the photothermographic material is used as the coating liquid for use in the present invention will now be described in detail.

Organic silver salts that can be used in the present invention are relatively stable to light; however, when heated to 80° C. or above in the presence of an exposed photocatalyst (latent image of light-sensitive silver halide and the like) and a reducer, they form silver images. The organic silver salts may be any organic substance containing a source that can reduce silver ions. Such non-light-sensitive organic silver salts are described in Japanese Patent Application Publication No. 10-62899, Paragraph Nos. 0048 and 0049; European Patent Publication No. 0803764A1, page 18, line 24 to page 19, line 37; European Patent Publication No.0962812A1. Silver salts of organic acids are preferable, and particularly preferable are the silver salts of long-chain aliphatic carboxylic acids (of which the number of carbon atoms is 10 to 30, preferably 15 to 28). Preferable examples of the organic silver salts include silver behenate, silver arachidate, silver stearate, silver oleate, silver laurate, silver capronate, silver myristate, silver palmitate, and the mixture thereof. Of these organic silver salts, the use of an organic silver salt containing 75 mol% or more silver behenate is preferable in the present invention.

The form of the organic silver salts that can be used in the present invention is not specifically limited, and may be needle-like, bar-like, plate-like, and flake-like. The distribution of the particle sizes of the organic silver salt is preferably simple distribution. Known methods can be applied to the method for manufacturing an organic silver salt used in the present invention and to the method for dispersing it. For example, the above-described Japanese Patent Application Publication No. 10-62899, European Patent Publication No. 0803763A1, European Patent Publication No. 962812A1 can be referred to.

In the present invention, although a light-sensitive material can be manufactured by mixing an aqueous dispersion of an organic silver salt and an aqueous dispersion of a light-sensitive silver salt, and the mixing ratio of the organic silver salt and the light-sensitive silver salt can be selected depending on the purpose, the percentage of the light-sensitive silver salt to the organic silver salt is preferably within a range between 1 mol % and 30 mol %, more preferably within a range between 3 mol % and 20 mol %, and most preferably within a range between 5 mol % and 15 mol %.

Although any desired quantity of an organic silver salt can be used in the present invention, the quantity as silver is preferably 0.1 g/m$^2$ to 5 g/m$^2$, and more preferably 1 g/m$^2$ to 3 g/m$^2$.

It is preferable that the photothermographic material of the present invention contains a reducer for organic silver salts. The reducer for organic silver salts may be any substance (preferably an organic substance) that reduces silver ions to metallic silver. Such reducers are described in Japanese Patent Application Publication No. 11-65021, Paragraph Nos. 0043 to 0045; or European Patent Publication No. 0803764A1, page 7, line 34 to page 18, line 12. In the present invention, bisphenol reducing agents (e.g. 1,1-bis(2-hydroxy-3,5-dimethylphenyl)-3,5,5-trimethylhexane, 2,2'-methylenebis-(4-methyl-6-tert-butylphenol), 2,2'-methylenebis-(4-ethyl-6-tert-butylphenol)) are particularly preferable. The amount of added reducing agent is preferably in the range of from 0.01 to 5.0 g/m$^2$, more preferably from 0.1 to 3.0 g/m$^2$, and the content of reducing agent is preferably in the range of from 5 to 50 mol %, more preferably from 10 to 40 mol % with respect to 1 mole of silver of the surface having an image forming layer.

The reducer may be contained in the coating liquid and therefore in the light-sensitive material in any form, such as a dissolved form, an emulsified and dispersed form, and a dispersed fine solid particle form.

One of well-known emulsifying and dispersing methods is a method wherein a reducer is dissolved in oil, such as dibutyl phthalate, tricresyl phosphate, glyceryl triacetate, or diethyl phthalate; or an auxiliary solvent, such as ethyl acetate and cyclohexanone; and then the emulsified dispersion is mechanically formed.

Fine solid particle dispersing methods include a method wherein the powder of a reducer is dispersed in a suitable solvent, such as water, using a ball mill, a colloid mill, a vibrating ball mill, a sand mill, a jet mill, a roller mill, or ultrasonic waves to form a solid dispersion. In this time, a protective colloid (for example, polyvinyl alcohol) or a surfactant (for example, an anionic surfactant, such as sodium triisopropylnaphthalenesulfate (mixture of compounds wherein three isopropyl groups are bonded to different substitution sites)) may be used. The aqueous dispersion may contain an antiseptic agent (for example, benzoisothiazolinone sodium salt).

In the photothermographic material of the present invention, a phenol derivative represented by equation (A) described in Japanese Patent Application No. 11-73951 is preferably used as a developing accelerator.

Halogen components in light-sensitive silver halides used in the present invention are not specifically limited, and silver chloride, silver chlorobromide, silver bromide, silver iodobromide, and silver iodochlorobromide can be used. The halogen components in a silver halide particle may be evenly distributed, may change stepwise, or may change continuously. Silver halide particles having a core-and-shell structure may also be preferably used.

Methods for forming light-sensitive silver halide are well known to those skilled in the art, for example, the method described in Research Disclosure, No. 17029, June 1978 and U.S. Pat. No. 3,700,458 can be used. Specifically, a light-sensitive silver halide is formed by adding a silver-providing compound and a halogen-providing compound in a solution of gelatin or other polymers, and then it is mixed with an organic silver salt. Also preferably used are methods described in Japanese Patent Application Publication No. 11-119374, Paragraph Nos. 0217 to 0224, and Japanese Patent Application Nos. 11-98708 and 11-84182.

It is preferable that the particle size of the light-sensitive silver halide is small for inhibiting clouding after forming images. Specifically, it is preferably 0.20 µm or smaller, more preferably 0.01 µm or larger and 0.15 µm or smaller, and most preferably 0.02 µm or larger and 0.12 µm or smaller. The particle size mentioned here refers to a diameter equivalent to that of a ball having a volume equivalent to that of the silver halide particle if the silver halide particle is a so-called normal crystal having a shape of cube or octahedron, or a non-normal crystal, for example, a spherical particle and a rod particle, and refers to a diameter equivalent to that of a circular image of which the area equals the projected area of the main surface if the silver halide particle is a flat particle.

The plane index (Miller index) of the outer surfaces of light-sensitive silver halide particles is not specifically limited; however, it is preferable that the percentage of [100] planes, which has a high spectral sensitization efficiency when spectral sensitizing dyes are adsorbed, is high. The percentage is preferably 50% or more, more preferably 65% or more, and most preferably 80% or more. The Miller index, the percentage of [100] planes, can be obtained using the method that utilizes the adsorption dependency of [111] planes and [100] planes in the adsorption of the sensitizing dyes, described in T. Tani; J. Imaging Sci., 29, 165 (1985).

The light-sensitive silver halide particles of the present invention contain metals or metal complexes of groups 8 to 10 in the periodic table (from group 1 to group 18). The preferable metals in metals or metal complexes of groups 8 to 10 are rhodium, ruthenium, and iridium. These metal complexes may be used alone, or in combination of two or more metals of the same group or of different groups. The content is preferably within a range between $1 \times 10^{-9}$ mole and $1 \times 10^{-3}$ mole to 1 mole of the silver. These heavy metals, metal complexes, and methods for the addition thereof are described in Japanese Patent Application Publication No. 7-225449; Japanese Patent Application Publication No. 11-65021, Paragraph Nos. 0018 to 0024; and Japanese Patent Application Publication No. 11-119374, Paragraph Nos. 0227 to 0240.

Furthermore, metal atoms (for example, $[Fe(CN)_6]^{4-}$) that can be contained in silver halide particles used in the present invention, and the desalination and chemical sensitization of silver halide emulsions are described in Japanese Patent Application Publication No. 11-84574, Paragraph Nos. 0046 to 0050; Japanese Patent Application Publication No. 11-65021, Paragraph Nos. 0025 to 0031; and Japanese Patent Application Publication No. 11-119374, Paragraph Nos. 0242 to 0250.

Various types of gelatin can be used as the gelatin contained in the light-sensitive silver halide emulsion used in the present invention. In order to maintain the dispersion of the light-sensitive silver halide emulsion in an organic-silver-salt-containing coating liquid, the use of a low-molecular-weight gelatin of a molecular weight of 500 to 60,000 is preferable. Although such a low-molecular-weight gelatin may be used when the particles are formed, or dispersed after desalination treatment, it is preferable to use when the particles are dispersed after desalination treatment.

As a sensitizing dye that can be used in the present invention, a sensitizing dye that can spectrally sensitize silver halide particles in a desired wavelength region when adsorbed on the silver halide particles, and that has a spectral sensitization commensurate with the spectral properties of the exposing light source can be chosen advantageously. Sensitizing dyes and method for adding are described in Japanese Patent Application Publication No. 11-65021, Paragraph Nos. 0103 to 0109; a compound represented by general formula (II) in Japanese Patent Application Publication No. 10-186572; a dye represented by general formula (I) in Japanese Patent Application Publication No. 11-119374, Paragraph No. 0106; U.S. Pat. No. 5,510,236; a dye described in Example 5 of U.S. Pat. No. 3,871,887; a dye disclosed in Japanese Patent Application Publication No. 2-96131 and No. 59-48753; and European Patent Publication No. 0803764A1, page 19, line 38 to page 20, line 35. These sensitizing dyes may be used alone, or may be used in combination of two or more dyes. In the present invention, the time for adding the sensitizing dye in the silver halide emulsion is preferably after the desalination step up to application, and more preferably after the desalination step and before starting chemical aging.

Although the amount of the added sensitizing dye in the present invention can be any desired quantity to meet the properties of sensitivity or fog, the quantity for 1 mole of the silver halide in the light-sensitive layer is preferably $10^{-6}$ mole to 1 mole, and more preferably $10^{-4}$ mole to $10^{-1}$ mole.

In order to improve efficiency of spectral sensitization, a strong color sensitizer can be used in the present invention. The strong color sensitizer used in the present invention may be the compounds described in European Patent Publication No. 587,338; U.S. Pat. Nos. 3,877,943, and 4,873,184; Japanese Patent Application Publication Nos. 5-341432, 11-109547, 10-111543, and the like.

It is preferable that the light-sensitive silver halide particles in the present invention are chemically sensitized by sulfur sensitization, selenium sensitization, or tellurium sensitization. Compounds preferably used in sulfur sensitization, selenium sensitization, and tellurium sensitization are well known to those skilled in the art, and include, for example, a compound described in Japanese Patent Application Publication No. 7-128768. Particularly in the present invention, tellurium sensitization is preferable, and the compounds described in Japanese Patent Application Publication No. 11-65021, Paragraph No. 0030, and the compounds represented by general formulas (I), (III), and (IV) in Japanese Patent Application Publication No. 5-313284 are more preferably used.

The light-sensitive silver halide emulsion in the light-sensitive material used in the present invention can be used alone, or two or more light-sensitive silver halide emulsions (for example, of different average particle sizes, different halogen compositions, different crystal habits, or different conditions of chemical sensitization) can be used in combination. The use of a plurality of light-sensitive silver halides of different sensitivities can control the tone. These techniques are disclosed in Japanese Patent Application Publication Nos. 57-119341, 53-106125, 47-3929, 48-55730, 46-5187, 50-73627, and 57-150841. The difference in sensitivity of each emulsion is preferably 0.2 log E or more.

The amount of the added light-sensitive silver halide in terms of the quantity of coating silver for 1 $m^2$ of the light-sensitive material is preferably 0.03 $g/m^2$ to 0.6 $g/m^2$, more preferably 0.05 $g/m^2$ to 0.4 $g/m^2$, and most preferably 0.1 $g/m^2$ to 0.4 $g/m^2$. To 1 mole of organic silver salt, the quantity of the light-sensitive silver halide is preferably 0.01 mole or more and 0.5 mole or less, and more preferably 0.02 mole or more and 0.3 mole or less.

The binder of an organic-silver-salt-containing layer of the present invention may be any polymer, and preferable binders are transparent or translucent, and are generally colorless. They include natural resins, polymers, and copolymers; synthetic resins, polymers, and copolymers; and other media forming films, for example, gelatins, gum arabic, polyvinyl alcohols, hydroxyethyl cellulose, cellulose acetate, cellulose acetate butyrate, polyvinyl pyrrolidone, casein, starch, polyacrylate, polymethyl methacrylate, polyvinyl chloride, polymethacrylate, styrene-maleic anhydride copolymers, styrene-acrylonitrile copolymers, styrene-butadiene copolymers, polyvinyl acetals (for example, polyvinyl formal and polyvinyl butyral), polyesters, polyurethanes, phenoxy resins, polyvinylidene chloride, polyepoxides, polycarbonates, polyvinyl acetate, cellulose esters, and polyamides. The binders may also be formed by coating from water, organic solvents, or emulsions.

In the organic-silver-salt-containing layer of the light-sensitive material of the present invention, hydrophilic polymers, such as gelatin, polyvinyl alcohol, methylcellulose, hydroxypropyl cellulose, and carboxymethyl cellulose may be added as required. The content of these hydrophilic polymers in the total quantity of binders in the organic-silver-salt-containing layer is preferably 30 wt % or less, and more preferably 20 wt % or less.

The total quantity of the binder in the image-forming layer of the present invention is within a range between 0.2 g/m$^2$ and 30 g/m$^2$, preferably between 1 g/m$^2$ and 15 g/m$^2$. In the image-forming layer of the present invention, a cross-linking agent for cross-linking, and a surfactant for improving coating properties may be added.

The anti-fog agent, stabilizer, and precursor for the stabilizer that can be used in the present invention include compounds described in Japanese Patent Application Publication No. 10-62899, Paragraph No. 0070, European Patent Publication No. 0803764A1, page 20, line 57 to page 21, line 7. The anti-fog agents preferably used in the present invention are organic halogen compounds, and are disclosed in Japanese Patent Application Publication No. 11-65021, Paragraph Nos. 0111 to 0112. The organic halogen compounds represented by formula (P) of Japanese Patent Application No. 11-87297, and the organic polyhalogen compound (specifically, tribromomethyl naphthyl sulfone, tribromomethyl phenyl sulfone, tribromomethyl(4-(2,4,6-trimethylphenylsulfonyl)phenyl)sulfone, and the like) represented by general formula (II) of Japanese Patent Application Publication No. 10-339934 are preferable.

Other anti-fog agents include the mercury (II) salt in Japanese Patent Application Publication No. 11-65021, Paragraph No. 0113, benzoates in Japanese Patent Application Publication No. 11-65021, Paragraph No. 0114, salicylic acid derivatives represented by formula (Z) in Japanese Patent Application No. 11-87297, formalin scavenger compounds represented by formula (S) in Japanese Patent Application No. 11-23995.

The photothermographic material of the present invention may contain an azolium salt for the purpose of preventing fog. The azolium salts include the compounds represented by general formula (XI) described in Japanese Patent Application Publication No. 59-193447, the compound described in Japanese Patent Publication No. 55-12581, and the compounds represented by general formula (II) described in Japanese Patent Application Publication No. 60-153039.

In the present invention, a mercapto compound, a disulfide compound, and a thion compound may be contained for inhibiting, accelerating, or controlling development; for improving the efficiency of spectral sensitization; and for improving storage stability before and after development. The specific examples are described in Japanese Patent Application Publication No. 10-62899, Paragraph Nos. 0067 to 0069; the compounds represented by general formula (I) of Japanese Patent Application Publication No. 10-186572, and Paragraph Nos. 0033 to 0052 as their specific examples; European Patent Publication No. 0803764A1, page 20, lines 36 to 56; and Japanese Patent Application No. 11-273670. Above all, a mercapto-substituted heterocyclic aromatic compound is preferable.

In the present invention, a compound having a phosphoryl group is preferably used, and phosphine oxides are particularly preferable. Specifically, these compounds include triphenylphosphine oxide, tri-(4-methylphenyl) phosphine oxide, tri-(4-methoxyphenyl) phosphine oxide, tri-(t-butylphenyl) phosphine oxide, tri-(3-methylphenyl) phosphine oxide and trioctylphosphine oxide. The compound having a phosphoryl group of the present invention can be introduced in a sensitive material in the same way as the reducing agent and polyhalogen compound. The content of compound having a phosphoryl group of the present invention is preferably in the range of from 0.1 to 10, more preferably from 0.1 to 2.0 with respect to the ratio of added reducing agent (molar ratio). It is more preferably in the range of from 0.2 to 1.0.

In the photothermographic material of the present invention, the addition of a toning agent is preferable. Toning agents are described in Japanese Patent Application Publication No. 10-62899, Paragraph Nos. 0054 and 0055; European Patent Publication No. 0803764A1, page 21, lines 23 to 48; and Japanese Patent Application No. 10-213487. Particularly preferable are phthaladinone, phthaladinone derivatives, or metal salts, or derivatives such as 4-(1-naphthyl) phthaladinone, 6-chlorophthaladinone, 5,7-dimethoxyphthaladinone, and 2,3-dihydro-1,4-phthaladinedione; the combination of phthaladinones and phthalic acid derivatives (for example, phthalic acid, 4-methyl phthalic acid, 4-nitro phthalic acid, and tetrachloro phthalic anhydride); phthaladines (phthaladine, phthaladine derivatives, or metal salts; or derivatives such as 4-(1-naphthyl) phthaladine, 6-isopropyl phthaladine, 6-t-butyl phthaladine, 6-chloro phthaladine, 5,7-dimethoxy phthaladine, and 2,3-dihydro phthaladine); and the combination of phthaladines and phthalic acid derivatives (for example, phthalic acid, 4-methyl phthalic acid, 4-nitro phthalic acid, and tetrachloro phthalic anhydride). Of these, the combination of phthaladines and phthalic acid derivatives is specifically preferable.

Plasticizers and lubricants that can be used in the light-sensitive layers of the present invention are described in Japanese Patent Application Publication No. 11-65021, Paragraph No. 0117; the super-high contrast agents for forming super-high contrast images are described in Japanese Patent Application Publication No. 11-65021, Paragraph No. 0118; Japanese Patent Application Publication No. 11-223898, Paragraph Nos. 0136 to 0193; Japanese Patent Application No. 11-87297, compounds of formulas (H), (1) to (3), (A), and (B); Japanese Patent Application No. 11-91652, compounds of general formulas (H) to (V) (specific compounds: compounds 21 to 24); and high-contrast promoters are described in Japanese Patent Application Publication No. 11-65021, Paragraph No. 0102, and Japanese Patent Application Publication No. 11-223898, Paragraph Nos. 0194 and 0195. The method for adding nucleators and the amount thereof are described in Japanese Patent Application Publication No. 11-223898, Paragraph Nos. 0182 and 0183.

When a nucleator is used in the photothermographic material of the present invention, it is preferable to use in combination with an acid or the salt thereof formed by hydrating diphosphorus pentaoxide. The acids or the salts thereof formed by hydrating diphosphorus pentaoxide include metaphosphoric acid (metaphosphorates), pyrophosphoric acid (pyrophosphorates), orthophosphoric acid (orthophosphorates), triphosphoric acid (triphosphorates), tetraphosphoric acid (tetraphosphorates), and hexametaphosphoric acid (hexametaphosphorates). Particularly preferable acids or the salts thereof formed by hydrating diphosphorus pentaoxide are orthophosphoric acid (orthophosphorates), and hexametaphosphoric acid (hexametaphosphorates). Specific salts include sodium orthophosphorate, dihydrogen sodium orthophosphorate, sodium hexametaphosphorate, and ammonium hexametaphosphorate. Although the quantity (coating quantity for 1 $m^2$ of the light-sensitive material) of acids or the salts thereof formed by hydrating diphosphorus pentaoxide may be as desired depending on the performance, such as sensitivity and fog, it is preferably 0.1 $mg/m^2$ to 500 $mg/m^2$, and more preferably 0.5 $mg/m^2$ to 100 $mg/m^2$.

The photothermographic material of the present invention may have a surface-protecting layer for the purpose of preventing the adherence of the image-forming layer. The surface-protecting layer is described in Japanese Patent Application Publication No. 11-65021, Paragraph Nos. 0119 to 0120.

Although gelatin is preferably used for the binder of the surface-protecting layer of the present invention, it is also preferable to use polyvinyl alcohol (PVA). PVA may include fully saponified PVA-105, partially saponified PVA-205, PVA-335, and modified polyvinyl alcohol MP-203 (all are trade names from Kuraray Co., Ltd.). The quantity of polyvinyl alcohol coating as the protecting layer (per layer) (per 1 $m^2$ of the support) is preferably 0.3 $g/m^2$ to 4.0 $g/m^2$, and more preferably 0.3 $g/m^2$ to 2.0 $g/m^2$.

Particularly, when the photothermographic material of the present invention is used for printing, wherein change in dimensions raises problems, the use of polymer latex in the protecting layer or the backing layer is preferable. Such polymer latexes are described also in Taira Okuda and Hiroshi Inagaki, "Synthetic Resin Emulsion", Kobunshi Kankoukai (1978); Takaaki Sugimura, Yasuo Kataoka, Soichi Suzuki, and Keiji Kasahara, "Application of Polymer Latex", Kobunshi Kankoukai (1993); and Soichi Muroi, "Chemistry of Polymer Latex", Kobunshi Kankoukai (1970). Specifically, the polymer latexes include a latex of methyl methacrylate (33.5 wt %)/ethyl acrylate (50 wt %)/methacrylic acid (16.5 wt %) copolymer; a latex of methyl methacrylate (47.5 wt %)/butadiene (47.5 wt %)/itaconic acid (5 wt %) copolymer; a latex of ethyl acrylate/metacrylic acid copolymer; a latex of methyl methacrylate (58.9 wt %)/2-etylhexyl acrylate (25.4 wt %)/styrene (8.6 wt %)/2-hydroxyethyl methacrylate (5.1 wt %)/acrylic acid (2.0 wt %) copolymer; and a latex of methyl methacrylate (64.0 wt %)/ styrene (9.0 wt %)/butyl acrylate (0.0 wt %)/2-hydroxyethyl methacrylate (5.0 wt %)/acrylic acid (2.0 wt %) copolymer. Furthermore, the combination of polymer latexes described in Japanese Patent Application No. 11-6872, the technique described in Japanese Patent Application No. 11-143058, Paragraph Nos. 0021 to 0025; the technique described in Japanese Patent Application No. 11-6872, Paragraph Nos. 0027 to 0028; and the technique described in Japanese Patent Application No. 10-199626, Paragraph Nos. 0023 to 0041 can be applied to binders for protecting layer. The content of the polymer latex for protecting layer is preferably 10 wt % to 90 wt % of the total binder, more preferably 20 wt % to 80 wt %.

The amount of the added total binders (including water-soluble polymers and latex polymers) of the protecting layer (per layer) (per 1 $m^2$ of the support) is preferably 0.3 $g/m^2$ to 5.0 $g/m^2$, and more preferably 0.3 $g/m^2$ to 2.0 $g/m^2$.

The photothermographic emulsion of the present invention is composed of one or more layers on the support. When it is composed of one layer, the layer must comprise an organic silver salt, silver halide, a developer, and a binder, and as required, additional materials, such as a toning agent, covering additives and other auxiliary agents. When it is composed of two layers, the first emulsion layer (normally the layer contacting the support) must contain an organic silver salt and silver halide, and the second layer or both layers must contain other several components. However, the constitution of two layers is conceivable in which a single emulsion layer contains all the components and the other layer comprises a protecting top coating. The constitution of a multicolor light-sensitive photothermographic material may contain the combination of these two layers for each color, and all the components may be contained in a single layer, as described in U.S. Pat. No. 4,708,928. In the case of a multi-dye multicolor light-sensitive photothermographic material, each emulsion layer is separated from each other and maintained by using a functional or non-functional barrier layer between the light-sensitive layers, as described in U.S. Pat. No. 4,460,681.

Various dyes or pigments (for example, C. I. Pigment Blue 60, C. I. Pigment Blue 64, and C. I. Pigment Blue 15:6) can be used in the light-sensitive layer of the present invention from the point of view of improving color tone, preventing the occurrence of interference fringes in exposing a laser beam, and preventing irradiation. These are described in detail in WO 98/36322, and Japanese Patent Application Publication Nos. 10-268465 and 11-338098.

In the photothermographic material of the present invention, an anti-halation layer can be provided on the side of light-sensitive layer remote from the light source.

A photothermographic material generally has non-light-sensitive layers in addition to a light-sensitive layer. Non-light-sensitive layers can be classified according to the location thereof into (1) a protecting layer provided on the light-sensitive layer (remote side from the support), (2) an intermediate layer provided between a plurality of light-sensitive layers or between the light-sensitive layer and the protecting layer, (3) a primer layer provided between the light-sensitive layer and the support, and (4) a backing layer provided on the side opposite to the light-sensitive layer. A filter layer is provided on the light-sensitive material as the layer (1) or (2). The anti-halation layer is provided on the light-sensitive material as the layer (3) or (4).

Anti-halation layers are described in, for example, Japanese Patent Application Publication No. 11-65021, Paragraph Nos. 0123 and 0124; Japanese Patent Application Publication Nos. 11-223898, 9-230531, 10-36695, 10-104779, 11-231457, 11-352625, and 11-352626.

The anti-halation layer contains an anti-halation dye having absorption in the exposure wavelength. When the exposure wavelength is in the infrared region, an infrared absorbing dye can be used, and in this case, the dye that has no absorption in the visible region is preferable.

If halation is prevented using a dye having absorption in the visible region, it is preferable that the color of the dye does not substantially remain after forming images, means to vanish the color with the heat of thermal development is used, and in particular, a thermally achromatizing dye and a base precursor are added to a non-light-sensitive layer to function as an anti-halation layer. These techniques are described in Japanese Patent Application Publication No. 11-231457 and the like.

The amount of the added achromatizing dye is determined according to the use of the dye. In general, it is used in a quantity that the optical density (absorbance) measured by the objective wavelength exceeds 0.1. The optical density is preferably 0.2 to 2. The quantity of the dye for obtaining such an optical density is generally approximately 0.001 g/m$^2$ to 1 g/m$^2$.

When the dye is achromatized, the optical density after thermal development can be lowered to 0.1 or less. Two or more achromatizing dyes may be used in combination in a thermally achromatizing recording material or a photothermographic material. Similarly, two or more base precursors may be used in combination.

In thermal achromatizing using such achromatizing dyes and base precursors, the combination use of a substance that lowers the melting point by 3 degrees or more by mixing with a base precursor such as described in Japanese Patent Application Publication No. 11-352626 (for example, diphenylsulfone and 4-chlorophenyl (phenyl) sulfone) is preferable from the point of view of thermal achromatizing.

In the present invention, for the purpose of improving change by aging of the silver color tone and the images, a colorant having an absorption maximum at 300 nm to 450 nm can be added. Such a colorant is described, for example, in Japanese Patent Application Publication Nos. 62-210458, 63-104046, 63-103235, 63-208846, 63-306436, 63-314535, 01-61745, and Japanese Patent Application No. 11-276751.

Such a colorant is normally added within a range between 0.1 mg/m$^2$ and 1 g/m$^2$, and the layer for the addition of the colorant is preferably the backing layer provided opposite to the light-sensitive layer.

The photothermographic material in the present invention is preferably a one-sided light-sensitive material having at least one light-sensitive layer containing a silver halide emulsion on one side of the support, and having a backing layer on the other side.

In the present invention, it is preferable to add a mat agent for improving conveying properties, and the mat agent is described in Japanese Patent Application Publication No. 11-65021, Paragraph Nos. 0126 to 0127. The quantity of the mat agent coating for 1 m$^2$ of the light-sensitive material is preferably 1 mg/m$^2$ to 400 mg/m$^2$, and more preferably 5 mg/m$^2$ to 300 mg/m$^2$.

Although any mat degree of the emulsion surface is optional unless stardust defects occur, the Peck flatness is preferably 30 seconds or more and 2,000 seconds or less, and more preferably 40 seconds or more and 1,500 seconds or less. The Peck flatness can be easily obtained in accordance with Japanese Industrial Standard (JIS) P8119, "Method for Testing Flatness of Paper and Cardboard Using Peck Tester", and TAPPI Standard Method T479.

In the present invention, the Peck flatness for a mat degree of the backing layer is preferably 1,200 seconds or less and 10 seconds or more, more preferably 800 seconds or less and 20 seconds or more, and most preferably 500 seconds or less and 40 seconds or more.

In the present invention, the mat agent is preferably contained in the outermost surface layer of the light-sensitive material or a layer that functions as the outermost surface layer, a layer close to the outer surface, or a layer that functions as the protecting layer.

The backing layer that can be applied to the present invention is described in Japanese Patent Application Publication No. 11-65021, Paragraph Nos. 0128 to 0130.

In the layers of the present invention, such as light-sensitive layer, the protecting layer, and the backing layer, a hardener can be used. Examples of hardeners include methods described in T. H. James, "The Theory of the Photographic Process, Fourth Edition", Macmillan Publishing Co., Inc. (1977), pages 77 to 87; multivalent metal ions described in page 78 of the same reference book; polyisocyanates described in U.S. Pat. No. 4,281,060 and Japanese Patent Application Publication No. 6-208193; epoxy compounds described in U.S. Pat. No. 4,791,042; and vinylsulfone-based compounds described in Japanese Patent Application Publication No. 62-89048 are preferably used.

The surfactants, the solvent, the support, the antistatic or conductive layer, and the method for obtaining color images that can be used in the present invention are described in Japanese Patent Application Publication No. 11-65021, Paragraph Nos. 0132, 0133, 0134, 0135, and 0136, respectively; and the lubricants are described in Japanese Patent Application Publication No. 11-84573, Paragraph Nos. 0061 to 0064, and Japanese Patent Application No. 11-106881, Paragraphs Nos. 0049 to 0062.

For a transparent support, polyester, especially polyethylene terephthalate having undergone heat treatment within a temperature range between 130° C. and 185° C. is preferably used for relieving internal strain remaining in the film during biaxial drawing, and eliminating thermal shrinkage strain occurring during thermal development. In the case of a photothermographic material for medical use, the transparent support may be colored with a blue dye (for example, dye-1 described in an example of in Japanese Patent Application Publication No. 8-240877), or may not be colored. It is preferable that the primer techniques of water-soluble polyester described in Japanese Patent Application Publication No. 11-84574, styrene-butadiene copolymer described in Japanese Patent Application Publication No. 10-186565, and vinylidene chloride copolymers described in Japanese Patent Application No. 11-106881, Paragraph Nos. 0063 to 0080 are applied to the support. To the antistatic layers or the primers, the techniques described in Japanese Patent Application Publication Nos. 56-143430, 56-143431, 58-62646, 56-120519, and 11-84573, Paragraph Nos. 0040 to 0051, U.S. Pat. No. 5,575,957, and Japanese Patent Application Publication No. 11-223898, Paragraph Nos. 0078 to 0084 can be applied.

The photothermographic material is preferably of a monosheet type (a type that can form images on a photothermographic material without using other sheets as in image-receiving materials).

To the photothermographic material, an antioxidant, a stabilizer, a plasticizer, an ultraviolet absorber, or coating additives may further be added. The various additives are added to either the light-sensitive layer or a non-light-sensitive layer. These are described in WO 98/36322, EP 803764A1, Japanese Patent Application Publication Nos. 10-186567 and 10-18568.

The photothermographic material in the present invention can be applied using any methods. Specifically, various coating operations can be used, including extrusion coating, slide coating, curtain coating, dip coating, knife coating, flow coating, and extrusion coating using a hopper of a type described in U.S. Pat. No. 2,681,294. Extrusion coating described in Stephen F. Kistler, Petert M. Schweizer, "Liquid Film Coating", (Chapman & Hall, 1997), pages 399 to 536, or slide coating are preferably used, and slide coating is most preferably used. An example of a form of slide coaters used for slide coating is shown in FIG. 11b.1 in page 427 of the above-described reference. If desired, two or more layers can be applied simultaneously using the methods described in pages 399 to 536 of the above-described reference, U.S. Pat. No. 2,761,791, and British Patent No. 837,095.

Techniques that can be used in the photothermographic material of the present invention are also described in EP 803764A1, EP 883022A1, WO 98/36322, Japanese Patent Application Publication Nos. 56-62648, 58-62644, 9-281637, 9-297367, 9-304869, 9-311405, 9-329865, 10-10669, 10-62899, 10-69023, 10-186568, 10-90823, 10-171063, 10-186565, 10-186567, 10-186569, 10-186570, 10-186571, 10-186572, 10-197974, 10-197982, 10-197983, 10-197985, 10-197986, 10-197987, 10-207001, 10-207004, 10-221807, 10-282601, 10-288823, 10-288824, 10-307365, 10-312038, 10-339934, 11-7100, 11-15105, 11-24200, 11-24201, 11-30832, 11-84574, 11-65021, 11-109547, 11-125880, 11-129629, 11-133536, 11-133537, 11-133538, 11-133539, 11-133542, 11-133543, and 11-223898.

The photothermographic material of the present invention may be developed using any methods, and normally, it is developed by heating the photothermographic material exposed image-wise. The developing temperature is preferably 80° C. to 250° C., and more preferably 100° C. to 140° C. The developing time is preferably 1 second to 180 seconds, more preferably 10 seconds to 90 seconds, and most preferably 10 seconds to 40 seconds.

The preferable system for thermal development is a plate-heater system. The preferable thermal development system by a plate-heater system is a system described in Japanese Patent Application Publication No. 11-133572.

Although the light-sensitive material of the present invention can be exposed using any methods, a preferable light source for exposure is laser beams. The preferable laser beams for the present invention include gas laser ($Ar^+$, He—Ne), YAG laser, dye laser, and semiconductor laser. A semiconductor laser and a second higher-harmonic-generating element can also be used.

The photothermographic material of the present invention forms black-and-white images by silver images, and is preferably used in the photothermographic material for medical diagnostics, the photothermographic material for industrial photography, the photothermographic material for printing, and the photothermographic material for COM.

EXAMPLES

Examples of carrying out the method for preparation and deaeration of the present invention for a coating liquid of photothermographic material will now be described. The present invention is not limited to those Examples.

First, the method for preparation of coating liquid constituent liquids constituting the coating liquid of photothermographic material will be described.

<<Preparation of Silver Halide Emulsion 1>>

A solution prepared by adding 3.1 ml of 1 wt % potassium bromide solution to 1421 ml of distilled water and then adding thereto 3.5 ml of 1 mol/L sulfuric acid and 31.7 g of phthalated gelatin was kept at 34° C. while it was stirred in a stainless reaction jar, and a solution A prepared by adding distilled water to 22.22 g of silver nitrite so that it was diluted to 95.4 ml and a solution B prepared by diluting 15.9 g of potassium bromide to 97.4 ml with distilled water were fully added thereto at a fixed flow rate for 45 seconds. Thereafter, 10 ml of 3.5 wt % hydrogen peroxide aqueous solution was added, and then 10.8 ml of 10 wt % benzoimidazole aqueous solution was added. Then, a solution C prepared by adding distilled water to 51.86 g of silver nitrate so that it was diluted to 317.5 ml was fully added at a fixed flow rate for 20 minutes, while a solution D prepared by diluting 45.8 g of potassium bromide to 400 ml with distilled water was added by a control double jet method while keeping pAg at 8.1. Potassium iridium (III) hexachloride was fully added so that its concentration was $1 \times 10^{-4}$ mole with respect to 1 mole of silver 10 minutes after the solutions C and D started being added. In addition, an aqueous solution of potassium iron (II) hexacyanide was fully added in the amount of $3 \times 10^{-4}$ mole with respect to 1 mole of silver 5 seconds after the addition of the solution C was completed. pH was adjusted to 3.8 using 0.5 mol/L sulfuric acid, stirring was stopped, and precipitation, desalination and rinsing steps were carried out. pH was adjusted to 5.9 using 1 mol/L sodium hydroxide to prepare a silver halide dispersion with pAg of 8.0.

The silver halide dispersion was kept at 38° C. while it was stirred, and 5 ml of 0.34 wt % methanol solution of 1,2-benzoisothiazolin-3-one was added, and after 40 minutes a methanol solution of spectrum sensitizing pigment A was added in the amount of $1 \times 10^{-3}$ mole with respect to 1 mole of silver, and after 1 minute the mixture was heated to 47° C. 20 minutes after the temperature was raised, sodium benzenethiosulfonate was added with a methanol solution in the amount of $7.6 \times 10^{-5}$ mole with respect to 1 mole of silver, and after 5 minutes a tellurium sensitizer B was added with a methanol solution in the amount of $1.9 \times 10^{-4}$ mole with respect to 1 mole of silver, and was left for aging for 91 minutes. 1.3 ml of 0.8 wt % methanol solution of N,N'-dihydroxy-N"-diethylmelamine was added, and after 4 minutes 5-methyl-2-mercaptobenzoimidazole was added with a methanol solution in the amount of $3.7 \times 10^{-3}$ mole with respect to 1 mole of silver and 1-phenyl-2-heptyl-5-mercapto-1,3,4-triazole was added with a methanol solution in the amount of $4.9 \times 10^{-3}$ mole with respect to 1 mole of silver to prepare a silver halide emulsion 1.

Particles in the prepared silver halide emulsion were pure silver bromide particles having a ball-equivalent average size of 0.046 $\mu$m and a ball-equivalent coefficient of size variation of 20%. The particle size and the like were determined from the average size of 1000 particles using an electron microscope. The [100] plane ratio of the particles was determined to be 80% using the Kubelka-Munk method.

<<Preparation of Silver Halide Emulsion 2>>

A silver halide emulsion 2 was prepared in the same manner as preparation of the silver halide emulsion 1 except that the liquid temperature during formation of particles was changed from 34° C. to 49° C., the solution C was added for 30 minutes, and potassium iron (II) hexacyanide was removed. Precipitation, desalination, rinsing and dispersion processes were carried out in the same manner as preparation of the silver halide emulsion 1. Spectral sensitization and chemical sensitization were carried out, and 5-methyl-2-mercaptobenzoimidazole and 1-phenyl-2-heptyl-5-mercapto-1,3,4-triazole were added in the same manner as preparation of the emulsion 1 to obtain the silver halide emulsion 2 except that the amount of spectrum sensitizing pigment A added was changed to $7.5 \times 10^{-4}$ mole with respect to 1 mole of silver, the amount of tellurium sensitizer B added was changed to $1.1 \times 10^{-4}$ mole with respect to 1 mole of silver, and the amount of 1-phenyl-2-heptyl-5-mercapto-1,3,4-triazole was changed to $3.3 \times 10^{-3}$ mole with respect to 1 mole of silver. Emulsion particles of the silver halide emulsion 2 were pure silver bromide cubic particles having a ball-equivalent average size of 0.080 µm and a ball-equivalent coefficient of size variation of 20%.

<<Preparation of Silver Halide Emulsion 3>>

A silver halide emulsion 3 was prepared in the same manner as preparation of the silver halide emulsion 1 except that the liquid temperature during formation of particles was changed from 34° C. to 27° C. In addition, precipitation, desalination, rinsing and dispersion processes were carried out in the same manner as preparation of the silver halide emulsion 1. The silver halide emulsion 3 was obtained in the same manner as the emulsion 1 except that the amount of added solid dispersion of spectrum sensitizing pigment A (gelatin aqueous solution) was changed to $6 \times 10^{-3}$ mole with respect to 1 mole of silver, and the amount of tellurium sensitizer B added was changed to $5.2 \times 10^{-4}$ mole with respect to 1 mole of silver. Emulsion particles of the silver halide emulsion 3 were pure silver bromide cubic particles having a ball-equivalent average size of 0.038 µm and a ball-equivalent coefficient of size variation of 20%.

<<Preparation of Mixed Emulsion A for Coating Liquid>>

70 wt % of silver halide emulsion 1,15 wt % of silver halide emulsion 2 and 15 wt % of silver halide emulsion 3 were dissolved, and 1 wt % aqueous solution of bemzothiazoriumiodide was added in the amount of $7 \times 10^{-3}$ mole with respect to 1 mole of silver.

<<Preparation of Flake-Shaped Aliphatic Silver Salt>>

87.6 kg of behenic acid manufactured by Henkel Co., Ltd. (trade name: Edenor C22-85R), 423 L of distilled water, 49.2 L of 5N-NaOH aqueous solution and 120 L of tert-butanol were mixed together, and were stirred and made to react at 75° C. for 1 hour to obtain a sodium behanate solution. On the other hand, 206.2 L of aqueous solution of 40.4 kg of silver nitrate (pH 4.0) was prepared and kept at a temperature of 10° C. A reaction container containing 635 L of distilled water and 30 L of tert-butanol was kept at a temperature of 30° C., and a total amount of the above described sodium behanate solution and a total amount of silver nitrate aqueous solution were added thereto at a fixed flow rate for 62 minutes and 10 seconds and 60 minutes, respectively while stirring. At this time, only the silver nitrate aqueous solution was added for 7 minutes and 20 seconds after the addition of the silver nitrate aqueous solution was started, and thereafter the addition of the sodium behenate solution was started, and only the sodium behenate solution was added for 9 minutes and 30 seconds after the addition of the silver nitrate aqueous solution was completed. At this time, the temperature in the reaction container was 30° C., and the external temperature was controlled so that the liquid temperature was kept constant. In addition, the pipe of the feeding system of the sodium behenate solution was thermally insulated by a steam trace, and the steam aperture was adjusted so that the temperature of liquid at the outlet of the edge of a feeding nozzle was kept at 75° C. In addition, the pipe of the feeding system of the silver nitrate aqueous solution was thermally insulated by circulating chilled water through the outer line of a duplex pipe. The position at which the sodium behenate solution was added and the position at which the silver nitrate aqueous solution was added were symmetrical with respect to the mixing axis, and their heights were adjusted so that the solutions did not contact a reaction solution.

The sodium behenate solution was completely added, and was thereafter stirred and left at the same temperature for 20 minutes, and then the temperature was decreased to 25° C. Thereafter, the solid matter was filtered out by suction filtration, and the solid matter was rinsed until the conductivity of the filtrate was 30 µS/cm. In this way, an aliphatic silver salt was obtained. The obtained solid matter was stored as a wet cake without being dried. The morphology of the obtained silver behenate particles was examined by electron photomicrography, and it was found that the silver behenate particle was a flake-shaped crystal having an average aspect ratio of 5.2, a ball-equivalent average diameter of 0.52 µm and a ball-equivalent coefficient of variation of 15%.

7.4 g of polyvinyl alcohol (trade name: PVA-217) and water were added to the wet cake equivalent to 100 g of dried solid matter so that the total weight thereof was 385 g, and then the wet cake was subjected to preliminary dispersion processing by a homomixer.

Then, the stock solution subjected to the preliminary dispersion processing was treated three times by a dispersing apparatus (trade name: Micro Fluidizer-M-110S-EH manufactured by Microfluidex International Corporation, using a G10Z interaction chamber) adjusted so that the pressure thereof was kept at 1750 kg/cm², whereby a silver behenate dispersion was obtained. For cooling operation, hose-type heat exchangers were each installed before and after the interaction chamber, the temperature of a coolant was adjusted to set the dispersing temperature at 18° C.

<<Preparation of 25 wt % Reducing Agent Dispersion>>

16 kg of water was added to 10 kg of 1,1-bis (2-hydroxy-3,5-dimethylphenyl)-3,5,5-trimethylhexane and 10 kg of 20 wt % aqueous solution of modified polyvinyl alcohol (Poval MP203 manufactured by Kuraray Co., Ltd.), and was sufficiently mixed to prepare a slurry. This slurry was delivered by a diaphragm pump, and was dispersed for 3 hours and 30 minutes by a lateral sand mill (UVM-2 manufactured by IMEX Co., Ltd.) filled with zirconium beads with the average diameter of 0.5 mm, and thereafter 0.2 g of benzoisothiazolinone sodium salt and water were added thereto to make an adjustment so that the concentration of the reducing agent was 25 wt %, whereby a reducing agent dispersion was obtained. Reducing agent particles contained in the reducing agent dispersion obtained in this way had a median diameter of 0.42 µm and the maximum particle size of 2.0 µm or smaller. The obtained reducing agent dispersion was filtered by a polypropylene filter with the pore size of 10.0 µm to remove foreign materials, and was then stored.

<<Preparation of 10 wt % Mercapto Compound Dispersion>>

8.3 kg of water was added to 5 kg of 1-phenyl-2-heptyl-5-mercapto-1,3,4-triazole and 5 kg of 20 wt % aqueous solution of modified polyvinyl alcohol (Poval MP203 manufactured by Kuraray Co., Ltd.), and was sufficiently mixed to prepare a slurry. This slurry was delivered by a diaphragm pump, and was dispersed for 6 hours by a lateral sand mill (UVM-2 manufactured by IMEX Co., Ltd.) filled with zirconium beads with the average diameter of 0.5 mm, and thereafter water was added thereto to make an adjustment so that the concentration of the mercapto compound was 10 wt %, whereby a mercapto dispersion was obtained. Mercapto compound particles contained in the mercapto compound dispersion obtained in this way had a median diameter of 0.40 µm and the maximum particle size of 2.0 µm or smaller. The obtained mercapto compound dispersion was filtered by a polypropylene filter with the pore size of 10.0 µm to remove foreign materials such as dust, and was then stored. In addition, it was filtered again by the polypropylene filter with the pore size of 10 µm immediately before it was used.

<<Preparation of 20 wt % Organic Polyhalogen Compound Dispersion-1>>

5 kg of tribromomethylnaphthylsulfone, 2.5 kg of 20 wt % aqueous solution of modified polyvinyl alcohol (Poval MP203 manufactured by Kuraray Co., Ltd.), 213 g of 20 wt % aqueous solution of sodium triisopropylnaphthalenesulfonate and 10 kg of water were added and mixed sufficiently to prepare a slurry. This slurry was delivered by a diaphragm pump, and was dispersed for 5 hours by a lateral sand mill (UVM-2 manufactured by IMEX Co., Ltd.) filled with zirconium beads with the average diameter of 0.5 mm, and thereafter 0.2 g of sodium benzoisothiazolinone and water were added thereto to make an adjustment so that the concentration of the organic polyhalogen compound was 20 wt %, whereby an organic polyhalogen compound dispersion was obtained. Organic polyhalogen compound particles contained in the polyhalogen compound dispersion obtained in this way had a median diameter of 0.36 $\mu$m and the maximum particle size of 2.0 $\mu$m or smaller. The obtained organic polyhalogen compound dispersion was filtered by a polypropylene filter with the pore size of 3.0 $\mu$m to remove foreign materials such as dust, and was then stored.

<<Preparation of 25 wt % Organic Polyhalogen Compound Dispersion-2>>

An organic polyhalogen compound was prepared in the same manner as preparation of the 20 wt % organic polyhalogen compound dispersion-1 except that 5 kg of tribromomethyl (4-(2,4,6-trimethylphenylsulfonyl) phenyl) sulfone was used instead of 5 kg of tribromomethylnaphthylsulfone, and was dispersed and diluted so that the concentration of the organic polyhalogen compound was 25 wt %, and was filtered. Organic polyhalogen compound particles contained in the organic polyhalogen compound dispersion obtained in this way had a median diameter of 0.38 $\mu$m and the maximum particle size of 2.0 $\mu$m or smaller. The obtained organic polyhalogen compound dispersion was filtered by a polypropylene filter with the pore size of 3.0 $\mu$m to remove foreign materials such as dust, and was then stored.

<<Preparation of 30 wt % Organic Polyhalogen Compound Dispersion-3>>

An organic polyhalogen compound was prepared in the same manner as preparation of the 20 wt % organic polyhalogen compound dispersion-1 except that 5 kg of tribromomethylphenylsulfone was used instead of 5 kg of tribromomethylnaphthylsulfone and the amount of 20 wt % MP203 aqueous solution was changed to 5 kg, and was dispersed and diluted so that the concentration of the organic polyhalogen compound was 30 wt %, and was filtered. Organic polyhalogen compound particles contained in the organic polyhalogen compound dispersion obtained in this way had a median diameter of 0.41 $\mu$m and the maximum particle size of 2.0 $\mu$m or smaller. The obtained organic polyhalogen compound dispersion was filtered by a polypropylene filter with the pore size of 3.0 $\mu$m to remove foreign materials such as dust, and was then stored. Thereafter it was stored at a temperature of 10° C. or lower until it was used.

<<Preparation of 5 wt % Solution of Phthalazine Compound>>

8 kg of modified polyvinyl alcohol MP203 manufactured by Kuraray Co., Ltd. was dissolved in 174.57 kg of water, and then 3.15 kg of 20 wt % aqueous solution of sodium triisopropylnaphthalenesulfonate and 14.28 kg of 70 wt % aqueous solution of 6-isopropylphthalazine were added thereto to prepare 5 wt % solution of 6-isopropylphthalazine.

<<Preparation of 20 wt % Pigment Dispersion>>

250 g of water was added to 64 g of C.I. Pigment Blue 60 and 6.4 g of Demor N manufactured by Kao Corp., and was sufficiently mixed to prepare a slurry. 800 g of zirconium beads with the average diameter of 0.5 mm were prepared, and put in a vessel together with the slurry, and were dispersed for 25 hours by a dispersing apparatus (¼ G Sand Grinder Mill manufactured by IMEX Co., Ltd.) to obtain a pigment dispersion. Pigment particles contained in the pigment dispersion obtained in this way had an average particle size of 0.21 $\mu$m.

<<Preparation of 40 wt % SBR latex>>

An SBR latex purified by ultrafiltration (UF) was obtained in the following manner.

A solution prepared by diluting the SBR latex described below ten times with distilled water was diluted and purified until the ion conductivity reached 1.5 mS/cm using a UF-purifying module FS03-FC-FUY03A1 (manufactured by Daisen Membrane System Co., Ltd.), and Sandet-BL manufactured by Sanyo Chemical Co., Ltd. was added so that the concentration thereof was 0.22 wt %. Further, NaOH and NH$_4$OH were added so that the ratio between Na$^+$ ion and the NH$_4^+$ ion was Na$^+$ ion: NH$_4^+$ ion=1:2.3 (molar ratio) to make an adjustment so that the pH was 8.4. The concentration of latex at this time was 40 wt %. (SBR Latex: Latex of -St(68)-Bu(29)-AA(3)-)

The average particle size was 0.1 $\mu$m, the concentration was 45 wt %, the average water content at 25° C. and 60% RH was 0.6 wt %, the ionic conductance level was 4.2 mS/cm (ionic conductance was measured with a latex stock solution (40%) at 25° C. using Conductometer CM-30S manufactured by Toa Denpa Industry Co., Ltd.), and pH was 8.2.

Coating liquid constituent liquids prepared as described above are each held in a constituent tank.

EXAMPLE 1

Example 1 will now be described in which a coating liquid forming an emulsion layer of a photothermographic material was prepared and deaerated from the above described coating liquid constituent liquids using the preparation and deaeration apparatus shown in FIG. 1, and the number of bubbles in the coating liquid was examined by a bubble detector provided just before the coating head.

First, 1.1 g of 20 wt % water dispersions of the pigment obtained as described above was fed to the stirring tank for preparing the coating liquid, and thereafter 103 g of organic acid silver dispersions was added with the location of the outlet of the liquid feeding pipe located about 3 cm below the surface of the first fed liquid of the pigment water dispersions in the stirring tank. Subsequently, 5 g of 20 wt % aqueous solution of polyvinyl alcohol PVA-205 (manufactured by Kuraray Co., Ltd.), 25 g of 25 wt % reducer dispersions described above, total 16.3 g of organic polyhalogen compound dispersions-1, -2 and -3 in the ratio of 5:1:3 (weight ratio), 6.2 g of 10% mercapto-compound dispersions, 106 g of 40 wt % SBR latex subjected to ultrafiltration (UF) purification and pH adjustment, and 18 mL of 5 wt % solution of butadiene compound were each added, and 10 g of halogenated silver mixed emulsion A was further added. In this case, the location of the outlet of the liquid feeding pipe in adding coating liquid constituent liquids after the 20 wt % aqueous solution of polyvinyl alcohol was slide-shifted so that the outlet was located about 20 cm below the liquid surface. A tank having an inner diameter of 160 cm was used for the stirring tank, and a turbine blade having a diameter of 40 cm was used for the stirring blade. The stirring tank was a tank with a jacket, in which the liquid in the tank was kept at a temperature of 35° C. by circulating heat insulating water. After all coating liquid constituent liquids were fed to the stirring tank, the pressure in the stirring tank was reduced to 30 kPa as absolute pressure, and the liquids were stirred and mixed and vacuum-deaerated for 180 minutes at a speed of 2 m/second as the circumference speed of the turbine blade (number of revolutions: 100 rpm).

Then, the prepared and deaerated coating liquid was fed to the stock tank. The liquid in the stock tank was kept at a temperature of 34° C. The coating liquid was fed from the stock tank to the floatation tank of the ultrasonic floatation type deaeration device at a flow rate of 5L/minute using a non-pulsation diaphragm pump. The liquid stayed in the floatation tank for 30 minutes, and the frequency of the applied ultrasonic wave was 35 kHz. The emulsion layer coating liquid discharged from the ultrasonic floatation type deaeration device was fed to the pipeline type continuous deaeration device. The pressure in the pipeline type deaeration device was 230 kPa as absolute pressure, and the frequency of the applied ultrasonic wave was 25 kHz. The emulsion layer coating liquid treated in the pipeline type deaeration device was fed to the coating head.

Then, the number of bubbles in the coating liquid was counted by the bubble detector provided in front of the coating head. Furthermore, the temperature of the coating liquid supplied to the coating head was 30° C. Also, The pipe linking together the stirring tank, stock tank, the ultrasonic floatation deaeration device, the pipeline type deaeration device and the coating head was modified into a duplex structure and hot water was made to flow through the outer pipe so that the temperature of the emulsion layer coating liquid after the stirring tank was gradually decreased to reach a predetermined temperature when the coating liquid was supplied to the coating head.

The viscosity of the emulsion layer coating liquid prepared and deaerated as described above was 85 (mPa·s) at 40° C. (No. 1 Rotor, 60 rpm) as measure by B Type Viscometer of Tokyo Instruments.

Measurements of the viscosity of the coating liquid at 25° C. by RFS Fluid Spectrometer manufactured by Rheometrics Far East Co., Ltd. were 1500, 220, 70, 40 and 20 (mPa·s) at the shear rates of 0.1, 1, 10, 100 and 1000 (1/second), respectively.

EXAMPLE 2

The coating liquid was prepared and deaerated in the same manner as Example 1 except that the flow rate of the liquid fed from the stock tank to the ultrasonic floatation deaeration device was 10 L/minute instead of 5 L/minute in Example 1, and the number of bubbles in the obtained coating liquid was counted by the bubble detector in the same manner as Example 1.

EXAMPLE 3

The coating liquid was prepared and deaerated in the same manner as Example 1 except that the flow rate of the liquid fed from the stock tank to the ultrasonic floatation deaeration device was 20 L/minute instead of 5 L/minute in Example 1, and the number of bubbles in the obtained coating liquid was counted by the bubble detector in the same manner as Example 1.

Comparative Example 1

The coating liquid was prepared and deaerated in the same manner as Example 1 except that a centrifugal separation type deaeration device was used instead of the ultrasonic floatation type deaeration device in Example 1, and the number of bubbles in the obtained coating liquid was counted by the bubble detector in the same manner as Example 1.

Comparative Example 2

The coating liquid was prepared and deaerated in the same manner as Example 1 except that the stirring tank in Example 1 was not decompressed, and the number of bubbles in the obtained coating liquid was counted by the bubble detector in the same manner as Example 1.

Comparative Example 3

The coating liquid was prepared and deaerated in the same manner as Example 1 except that the treatment in the ultrasonic floatation type deaeration device in Example 1 was not carried out, and the number of bubbles in the obtained coating liquid was counted by the bubble detector in the same manner as Example 1.

Comparative Example 4

The coating liquid was prepared and deaerated in the same manner as Example 3 except that the treatment in the ultrasonic floatation type deaeration device in Example 3 was not carried out, and the number of bubbles in the obtained coating liquid was counted by the bubble detector in the same manner as Example 1.

Comparative Example 5

The coating liquid was prepared and deaerated in the same manner as Example 1 except that the treatment in the pipeline type deaeration device in Example 1 was not carried out, and the number of bubbles in the obtained coating liquid was counted by the bubble detector in the same manner as Example 1.

Comparative Example 6

The coating liquid was prepared and deaerated in the same manner as Example 3 except that the treatment in the pipeline type deaeration device in Example 3 was not carried out, and the number of bubbles in the obtained coating liquid was counted by the bubble detector in the same manner as Example 1.

The results of counting the number of bubbles by the bubble detector in Examples 1 to 3 in which preparation and deaeration were performed as described above, and the results of counting the number of bubbles by the bubble detector in Comparative Examples 1 to 6 are shown in Table 1.

TABLE 1

| | The number of bubbles (/minute) |
|---|---|
| Example 1 | 0 |
| Example 2 | 0 |
| Example 3 | 0 |
| Comparative Example 1 | Components coagulated |
| Comparative Example 2 | 12 |
| Comparative Example 3 | 89 |
| Comparative Example 4 | 156 |
| Comparative Example 5 | 486 |
| Comparative Example 6 | 753 |

As apparent from the results shown in Table 1, the numbers of bubbles in the coating liquid in Examples 1 to 3 in which the coating liquid was prepared and deaerated by the preparation and deaeration method of the present invention were all zero. As a result, bubble troubles such as bubble lines and pinholes did not occur in the coating film of the photosensitive layer applied on the base by the coating head.

Also, the flow rate of the liquid fed from the stock tank to the ultrasonic floatation deaeration device was increased from 5 L/minute in Example 1 to 10 L/minute in Example 2 to 20 L/minute in Example 3, but the deaeration performance of the ultrasonic floatation deaeration device was not adversely affected. This means that by providing the ultrasonic floatation deaeration device for removing mainly bubbles of large sizes, the overall deaeration performance of the preparation and deaeration apparatus can be improved. Hence, the preparation and deaeration apparatus of the present invention can deaerated a large amount of coating liquid, and therefore the coating speed with the coating head can be increased, thus making it possible to improve productivity.

On the other hand, in Comparative Example 1 in which the centrifugal separation type deaeration device was used instead of the ultrasonic floatation type deaeration device in Example 1, components of the coating liquid coagulated as a problem to be dealt with before removing bubbles in the coating liquid because a high level of shear force was exerted on the coating liquid in the centrifugal separation type deaeration device. As a result, the photosensitivity of the coating film on the base was considerably reduced.

Also, in Comparative Example 2 in which the coating liquid was prepared and deaerated in the same manner as Example 1 except that the stirring tank was not decompressed (the number of bubbles in the coating liquid: 12/minute), Comparative Example 3 in which the coating liquid was prepared and deaerated in the same manner as Example 1 except that the treatment in the ultrasonic floatation type deaeration device was not carried out (the number of bubbles in the coating liquid: 89/minute), Comparative Example 4 in which the coating liquid was prepared and deaerated in the same manner as Example 3 except that the treatment in the ultrasonic floatation type deaeration device was not carried out (the number of bubbles in the coating liquid: 156/minute), Comparative Example 5 in which the coating liquid was prepared and deaerated in the same manner as Example 1 except that the treatment in the pipeline type deaeration device was not carried out (the number of bubbles in the coating liquid: 486/minute) and Comparative Example 6 in which the coating liquid was prepared and deaerated in the same manner as Example 3 except that the treatment in the pipeline type deaeration device was not carried out (the number of bubbles in the coating liquid: 753/minute), bubbles remained in the coating liquid in any case. As a result, bubble troubles such as bubble lines occurred in the coating film of the photosensitive layer applied on the base by the coating head.

In this way, if the preparation and deaeration method of the present invention is applied to a coating liquid of photothermographic material having a thixotropic nature and having a nature in which components of the coating liquid coagulate when a high level of shear force is applied, the coating liquid can reliably be deaerated without adversely affecting the quality of the deaerated coating liquid. Therefore, the preparation and deaeration of the present invention can be applied irrespective of the nature of the coating liquid.

As described above, according to the method and the apparatus for preparation and deaeration of a coating liquid of the present invention, bubbles in the coating liquid can reliably be removed irrespective of the nature of the coating liquid. Also, a large amount of coating liquid can be treated, and the possibility that the quality of the deaerated coating liquid is adversely affected is eliminated.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method for preparation and deaeration of a coating liquid, the method comprising:
    a first step of stirring and mixing a plurality of coating liquid constituent liquids fed into a stirring tank at such a low speed that bubbles are not formed to prepare a coating liquid, and removing bubbles in the liquid under reduced pressure;
    a second step of applying an ultrasonic wave to the coating liquid after the first step under one of atmospheric pressure and reduced pressure in a floatation tank to cause bubbles in the coating liquid to grow and gather and float to a surface of the liquid, thereby removing the bubbles in the liquid; and
    a third step of continuously feeding the coating liquid after the second step through a pipeline in such a manner that no liquid surface is created, and applying an ultrasonic wave to the coating liquid flowing through the pipeline under pressure to dissolve bubbles in the coating liquid, thereby removing the bubbles in the coating liquid.

2. The method for preparation and deaeration of the coating liquid as defined in claim 1, wherein the plurality of coating liquid constituent liquids are fed to the stirring tank one after another, and outlets of liquid feeding pipes for coating liquids fed after a first coating liquid are located below a surface of the liquid in the stirring tank.

3. The method for preparation and deaeration of the coating liquid as defined in claim 1, wherein the coating liquid is a photothermographic material having a thixotropic nature and a nature in which components of the coating liquid coagulate when a high level of shear force is applied.

4. The method for preparation and deaeration of the coating liquid as defined in claim 1, wherein the coating liquid after the third step is fed to a coating head and applied to a base, the coating liquid fed to the coating head is gradually cooled during a period between a time when the first step is completed and a time when the coating head is reached, and a difference between a temperature of the coating liquid in the first step and a temperature of the coating liquid in an inlet to the coating head is no less than 1° C. and no more than 10° C.

5. The method for preparation and deaeration of the coating liquid as defined in claim 1, wherein the stirring in the first step is carried out using a stirring blade at a circumference speed of 1 to 10 m/second.

6. The method for preparation and deaeration of the coating liquid as defined in claim 1, wherein a frequency of the ultrasonic wave in the second step is in a range of from 25 kHz to 40 kHz.

7. An apparatus for preparation and deaeration of a coating liquid, the apparatus comprising:
    constituent liquid tanks which hold a plurality of coating liquid constituent liquids for preparation of a coating liquid;
    a preparation and deaeration device which stirs and mixes the coating liquid constituent liquids fed into a stirring tank from the constituent liquid tanks at such a low speed that bubbles are not formed to prepare the coating liquid, and removes bubbles in the liquid under reduced pressure;
    an ultrasonic floatation type deaeration devices which applies an ultrasonic wave to the coating liquid prepared and deaerated in the preparation and deaeration device in a floatation tank under one of atmospheric pressure and reduced pressure so as to remove bubbles in the coating liquid; and a pipeline type continuous deaeration device which continuously feeds the coating liquid deaerated in the ultrasonic floatation type deaeration device through a pipeline in such a manner that no liquid surface is created, and simultaneously applies an ultrasonic wave to the coating liquid under pressure to dissolve bubbles in the coating liquid so as to remove the bubbles in the coating liquid.

8. The apparatus for preparation and deaeration of the coating liquid as defined in claim 7, further comprising:

a liquid feeding pipe through which the coating liquid constituent liquids are fed from the constituent liquid tanks to the stirring tank; and a changing device which changes a height of an outlet of the liquid feeding pipe according to a height of a surface of the liquid in the stirring tank.

* * * * *